US009481264B2

(12) United States Patent
White

(10) Patent No.: US 9,481,264 B2
(45) Date of Patent: Nov. 1, 2016

(54) SUSPENSION APPARATUS AND METHOD FOR CONTACT WIRE AT THE TROUGH AND CREST OF A TRACK VERTICAL CURVE

(71) Applicant: Paul F. White, Wellesley, MA (US)

(72) Inventor: Paul F. White, Wellesley, MA (US)

(*) Notice: Subject to any disclaimer, the term of this patent is extended or adjusted under 35 U.S.C. 154(b) by 0 days.

(21) Appl. No.: 14/120,625

(22) Filed: Jun. 10, 2014

(65) Prior Publication Data
US 2014/0284161 A1  Sep. 25, 2014

Related U.S. Application Data

(62) Division of application No. 13/506,741, filed on May 15, 2012, now Pat. No. 8,757,340.

(51) Int. Cl.
*B60M 1/20* (2006.01)
*B60M 1/24* (2006.01)
*B60M 1/225* (2006.01)
*B60M 1/234* (2006.01)

(52) U.S. Cl.
CPC .............. *B60M 1/20* (2013.01); *B60M 1/225* (2013.01); *B60M 1/24* (2013.01); *B60M 1/234* (2013.01); *Y10T 29/49826* (2015.01)

(58) Field of Classification Search
CPC ........ B60M 1/20; B60M 1/22; B60M 1/225; B60M 1/123; B60M 1/24
USPC ...................................................... 191/40–43
See application file for complete search history.

(56) References Cited

U.S. PATENT DOCUMENTS

| 802,305 | A | * | 10/1905 | McIlwain | 246/9 |
| 1,033,104 | A | * | 7/1912 | Jellinek et al. | 191/40 |
| 1,050,643 | A | * | 1/1913 | Gilmore | 191/38 |
| 1,055,691 | A | * | 3/1913 | Aalborg | 191/41 |
| 1,336,503 | A | * | 4/1920 | Brown et al. | 191/41 |
| 1,401,650 | A | * | 12/1921 | Schaake | 191/40 |
| 1,401,999 | A | * | 1/1922 | Manz et al. | 191/41 |
| 1,459,174 | A | * | 6/1923 | Wrenn et al. | 191/40 |
| 1,563,386 | A | * | 12/1925 | McGee | 191/41 |
| 1,592,369 | A | * | 7/1926 | Jorstad | 191/41 |
| 1,643,209 | A | * | 9/1927 | Griffith | 191/41 |
| 1,668,346 | A | * | 5/1928 | Varney | 191/40 |
| 1,692,104 | A | * | 11/1928 | Moon | 191/41 |
| 1,756,316 | A | * | 4/1930 | Viele | 191/41 |
| 1,802,046 | A | * | 4/1931 | Bower | 248/61 |

(Continued)

FOREIGN PATENT DOCUMENTS

JP  57074228 A * 5/1982 ............ B60M 1/234
JP  57107922 A * 7/1982 ............ B60M 1/20

*Primary Examiner* — Zachary Kuhfuss
(74) *Attorney, Agent, or Firm* — Thomas P. O'Connell; O'Connell Law Firm

(57) ABSTRACT

A device and method for suspending or holding down an overhead contact wire used for supplying power to electrical railway vehicles and trolley buses at the crest or trough of a vertical curve where the contact wire has an abrupt change in line angle. The device smoothes out the abrupt angle into a curve; parabolic in form and of a radius that is smooth for trouble-free operation of current collectors while maintaining elastic suspension. Contact wire uplift continues while passing through the device so that there is an avoidance of hard spots which cause uneven and accelerated contact wire wear. The device can further be used at the crest and/or trough of a vertical curve to maintain contact wire alignment where a horizontal curve with curve pull is encountered concurrently.

7 Claims, 16 Drawing Sheets

(56) References Cited

U.S. PATENT DOCUMENTS

| | | | |
|---|---|---|---|
| 1,810,733 A * | 6/1931 | Schaake | 191/40 |
| 1,834,659 A * | 12/1931 | Teramoto | 191/41 |
| 2,013,355 A * | 9/1935 | Matthes | 191/40 |
| 2,041,110 A * | 5/1936 | Birch | 191/40 |
| 2,239,582 A * | 4/1941 | Wahlberg et al. | 191/40 |
| 2,239,656 A * | 4/1941 | Sparhawk | 191/40 |
| 2,287,692 A * | 6/1942 | Matthes | 191/40 |
| 2,325,788 A * | 8/1943 | Matthes | 191/40 |
| 2,338,510 A * | 1/1944 | Hanna et al. | 191/33 R |
| 2,354,869 A * | 8/1944 | Matthes | 191/40 |
| 2,404,088 A * | 7/1946 | Pinkerton | 191/33 R |
| 2,426,151 A * | 8/1947 | Matthes | 191/40 |
| 2,436,089 A * | 2/1948 | Birch | 191/41 |
| 2,491,973 A * | 12/1949 | Hanna et al. | 191/40 |
| 3,085,775 A * | 4/1963 | Crates et al. | 248/61 |
| 3,586,307 A * | 6/1971 | Brownyer | B60G 11/10 267/47 |
| 3,644,688 A * | 2/1972 | Tustin et al. | 191/40 |
| 3,829,630 A * | 8/1974 | Belyaev | 191/41 |
| 4,208,969 A * | 6/1980 | Baltensperger et al. | 104/111 |
| 4,398,624 A * | 8/1983 | Seddon | 191/40 |
| 4,454,389 A * | 6/1984 | Oda et al. | 191/43 |
| 4,637,594 A * | 1/1987 | Saito et al. | 267/47 |
| 2013/0306422 A1* | 11/2013 | White | 191/40 |

* cited by examiner

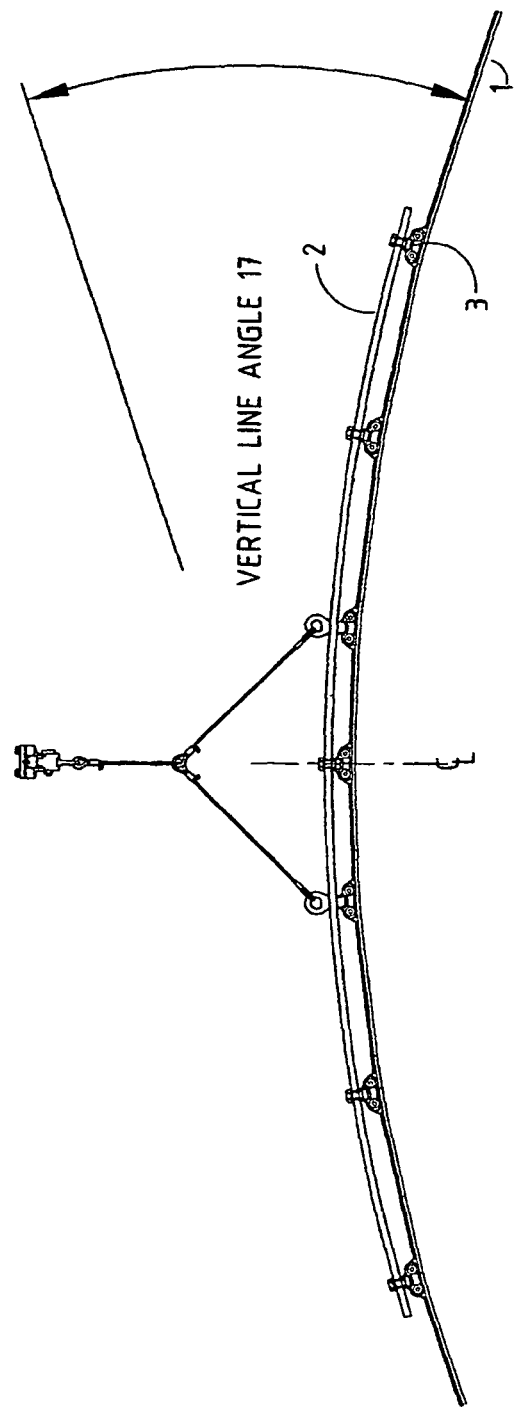

VERTICAL CURVE RAIL ASSEMBLY "A"

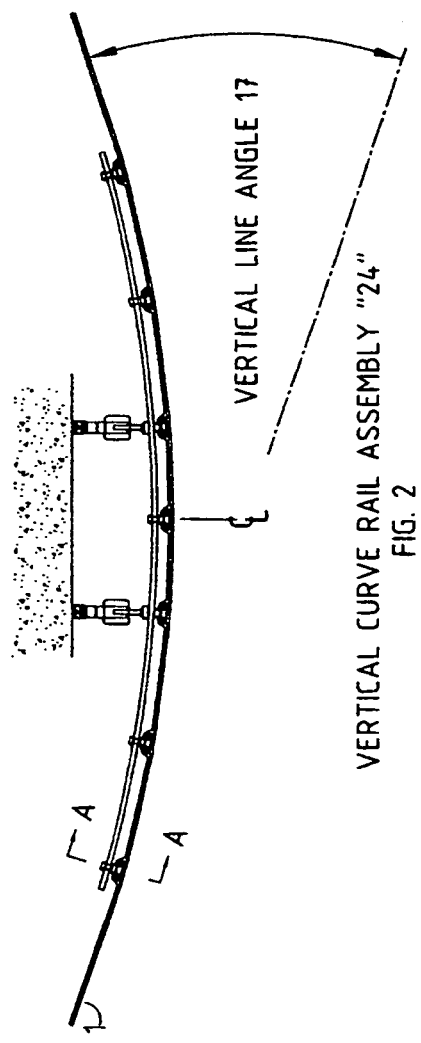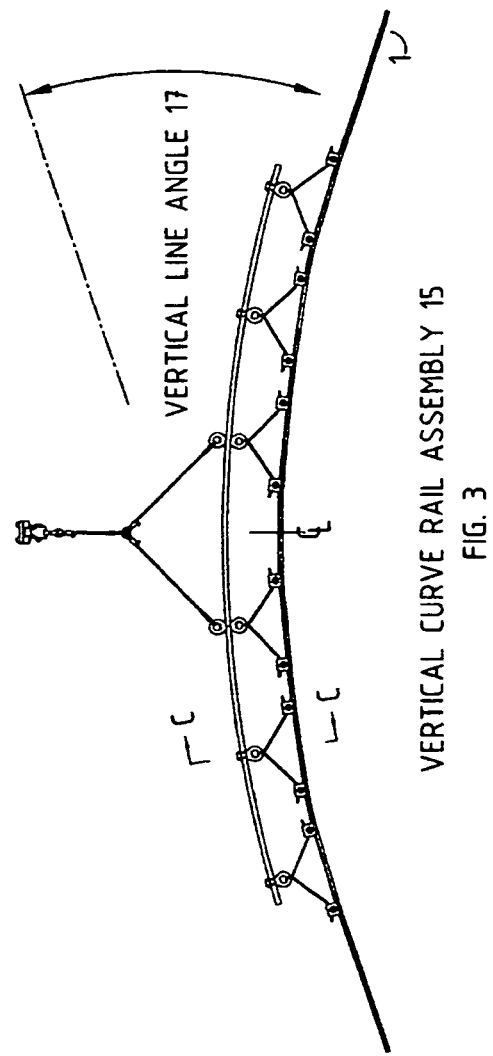

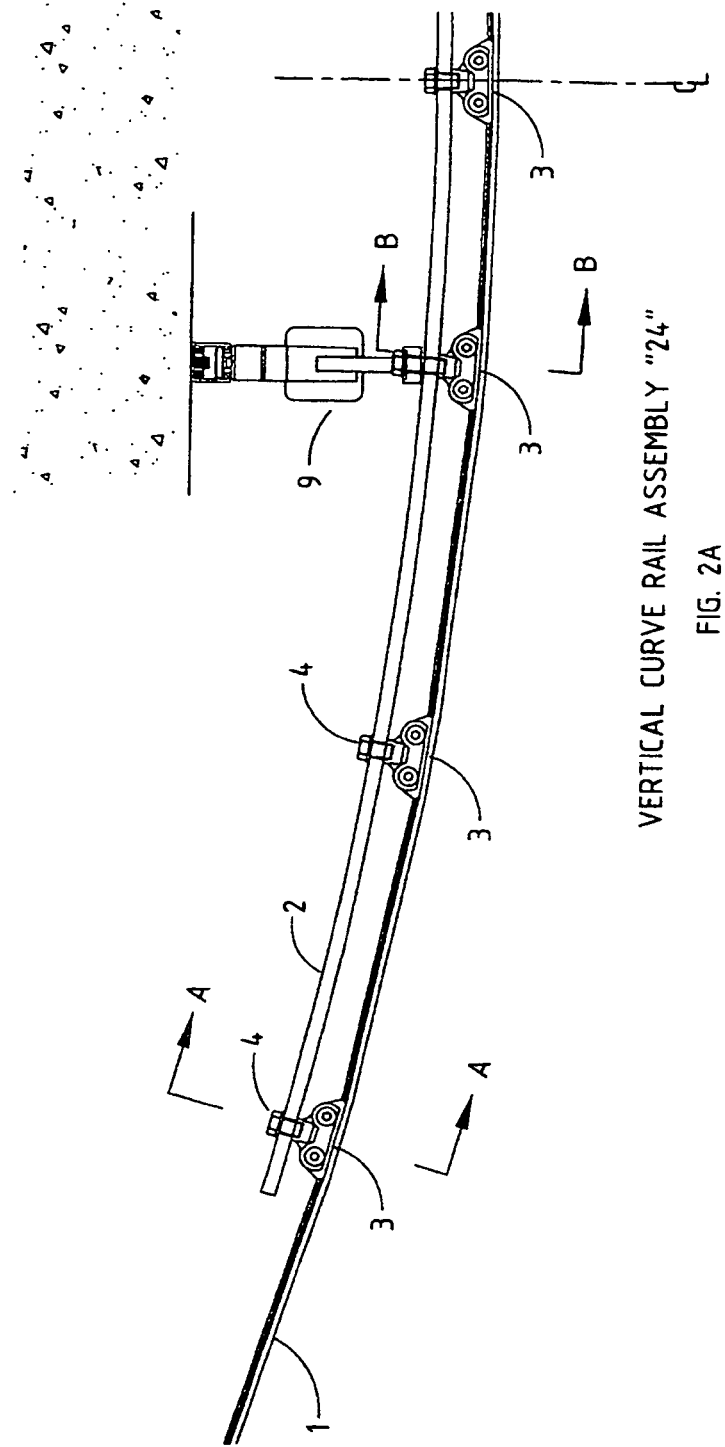

VERTICAL CURVE RAIL ASSEMBLY 15

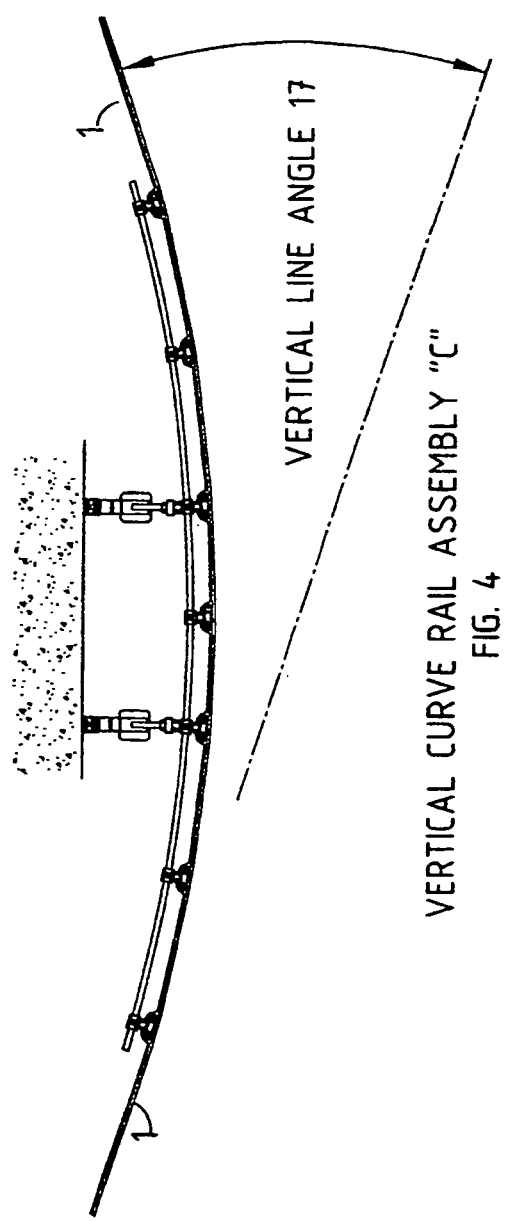

VERTICAL CURVE RAIL ASSEMBLY "C"

VIEW A-A

VIEW B-B

VIEW C-C

VIEW D-D

VIEW E-E

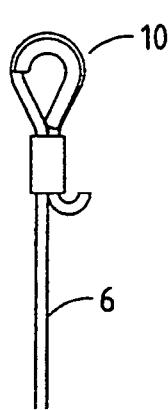
FIG. 15
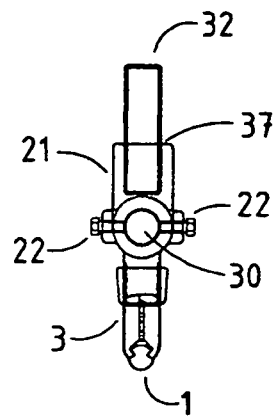
VIEW F-F
FIG. 16
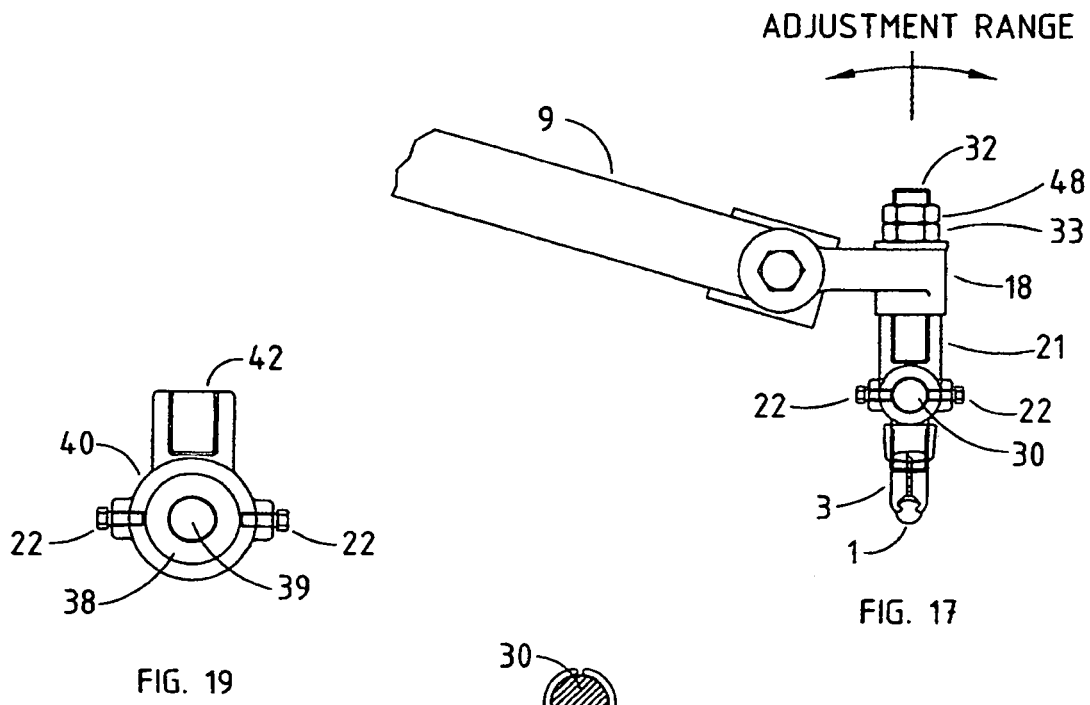
FIG. 17
FIG. 19
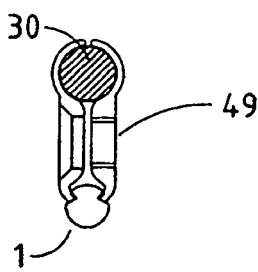
VIEW G-G
FIG. 25

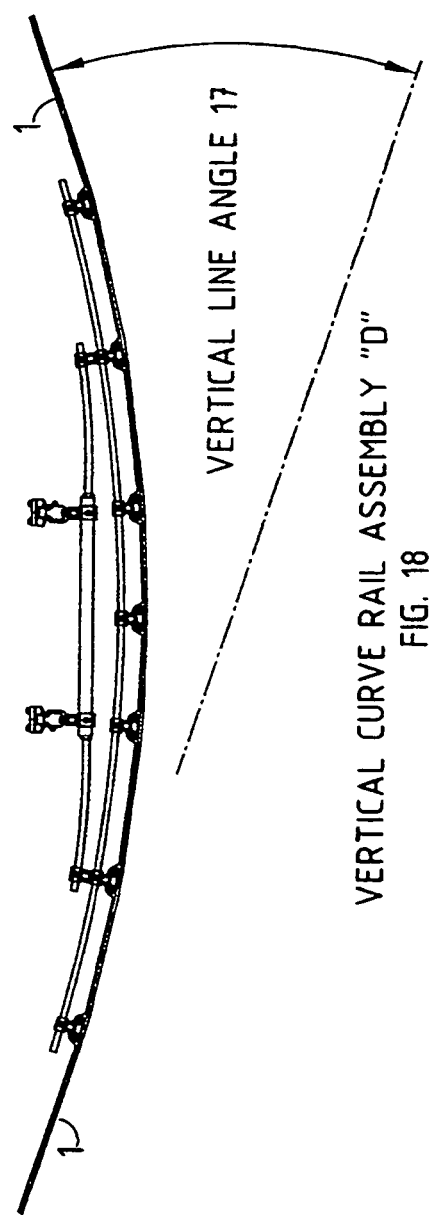

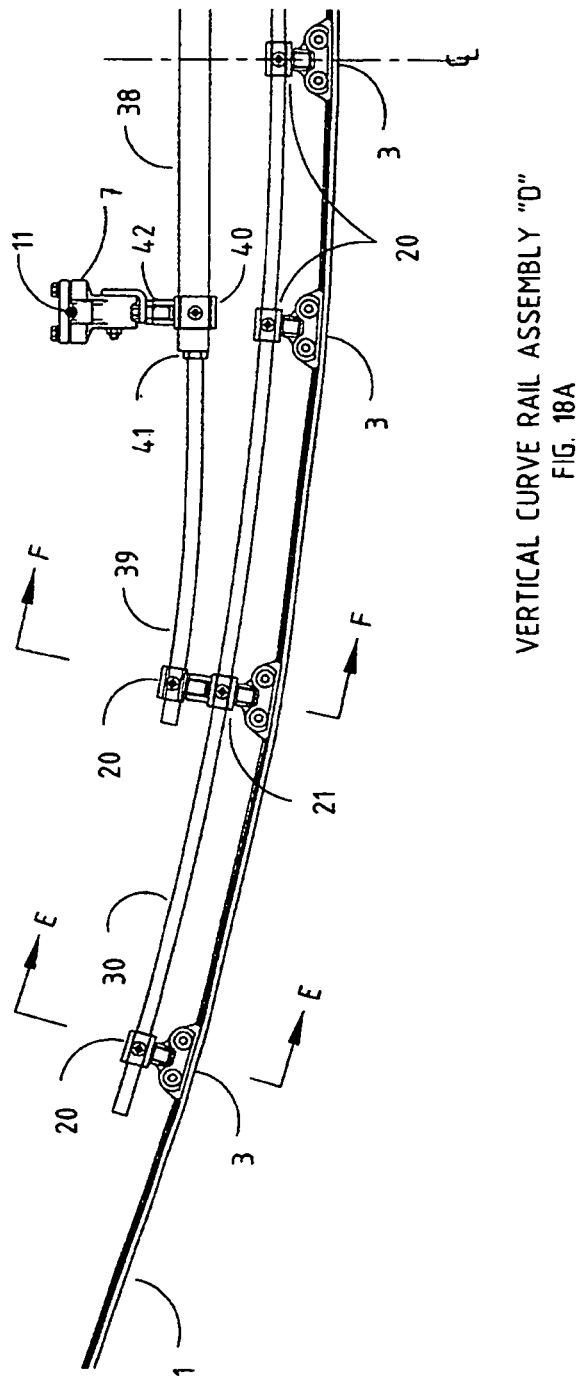

SUSPENSION APPARATUS AND METHOD FOR CONTACT WIRE AT THE TROUGH AND CREST OF A TRACK VERTICAL CURVE

This application is a divisional of my prior application entitled Vertical Curve Rail and Method, application Ser. No. 13/506,741, filed May 15, 2012, now pending

BACKGROUND OF THE INVENTION

1. Field of the Invention

The invention resides in the field of overhead contact systems suspension apparatus and more particularly relates to an apparatus and method used where a contact line is subjected to an abrupt change in line angle at a suspension point such as at the crest or trough of a vertical curve of the associated railway track or roadway but can also be attributed to a required change in contact wire height at low clearance areas such as bridge overpasses or tunnels where the change in contact wire height must be achieved over a relatively short distance.

2. History of the Prior Art

Electrically powered vehicles such as streetcars, trolley buses, light rail vehicles or electric locomotives utilize a current collecting device such as a trolley pole or a pantograph which rides on top of the vehicle and contacts the trolley contact wire of the overhead contact line. Where the overhead contact line must be either lowered or raised in height over a short distance, an abrupt change in direction of the contact wire occurs and the force from this line angle causes the contact wire to be pulled down at the crest of a vertical curve or pushed up at the trough of the vertical curve whether or not the associated track or roadway is vertically horizontal or horizontally curved. The vertical curve rail counteracts the applied forces in the contact wire to hold the wire in a position allowing the current collector to travel along it without erratic movement so that bounce and electrical arcing are prevented. At the crest or trough of a vertical curve the contact wire forms an abrupt angle that the current collector must negotiate. The angle can sometimes be smoothed out using a messenger wire for crests along the curve where the individual catenary hangers or dropper wires attached to it lift the contact wire at close intervals to reduce the overall angle to a series of very small angles that are negotiable for the current collector. At troughs along the curve, for some types of applications, the contact wire is not suspended for several spans so that it sags with a curve of such degree that the current collector can negotiate the curve as the abruptness of angle change is substantially reduced. Another method of smoothing out the trough curve is to add weight to the contact wire so that it has more than normal weight over a short span and sags in a similar manner as the long span and the weight counteracts the lifting force of the angle so that equilibrium is achieved. Where these mitigation methods cannot be employed, the abrupt angle is not allowed to be smoothed out and remains in place through the use of hold down or hold up spans so that an erratic operation of the current collector occurs where bounce, arcing and accelerated wear of the contact wire result. If the speed of the vehicle is great enough, the current collector may skip off the wire at the trough curve or be accelerated upwards at great force at the crest curve causing wear of the contact wire and the rubbing of the surface of the current collector due to increased frictional forces. The contact wire must be held in place at these locations, and either span wires or bracket arms are employed to suspend the wire at the crest of a vertical curve or hold it down at the trough of a vertical curve.

Various inventions in the prior art have addressed these difficulties. For example, U.S. Pat. No. 393,317 to Van Depoele discloses an arched suspender where a bar is attached to an arch, and the bar has an ear attached to it which holds the trolley wire contact line. The bar is flexible only in the horizontal plane where it acts as a pullover to hold the contact wire in position for horizontal curves and does not act in the vertical plane. U.S. Pat. No. 499,167 to Hunter details a trolley wire curve where at curves, the trolley wire is carried about the curve with suitable bends held in place by stay wires also referred to as pulloffs. Directly below the contact wire, a second wire is suspended and is connected to the main wire by ears. The suspended secondary wire acts in the horizontal plane to conform to the angle produced by bending at each pulloff or stay wire and does not act in the vertical plane nor does it provide an elastic suspension because components are rigidly attached. U.S. Pat. No. 584,911 to Westinghouse makes use of a supplemental wire attached to a suspension point and connected to the trolley wire contact line at two points, each on one side of the suspension span. This is done to reduce the angle formed at the suspension point so that the vertical curve at the suspension point is reduced. However, the projected line is level and not at a vertical curve of the track or roadway and the angle produced to which the supplemental wire is allegedly used to reduce is a normal angle produced by the sag of the wire. This invention is not adaptable or compatible with the angle and suspension created at a vertical curve and is designed to keep the trolley wire contact line level and of consistent height rigidly for a fixed vertical trolley pole current collector that is 90 degrees to the contact wire. In U.S. Pat. No. 918,761 to Mayer a trolley wire suspender is disclosed. This device consists of a resilient bar of decreasing cross sectional area to which the trolley wire is rigidly attached through a series of clips that completely encircle the wire. Although the device bends in the horizontal and vertical planes, FIG. 3 and FIG. 4 show clip 4 and clip 7 encircling the contact wire in a manner where the current collector would contact the wire and the clip. Such clips shown in FIGS. 3 and 4 do not allow the use of a trolley wheel or sliding shoe. A variation of these clips is devised, as shown in FIG. 6, for the use of a FIG. 8 or grooved contact wire. Two separate and distinct clip variations must be employed for current collectors to which Mayer refers as a bow or a wheel. This is synonymous with the pantograph or trolley pole current collector of today. Mayer discloses in FIG. 1 a flexible bar that in a preferred embodiment decreases in cross section from the center towards the ends in a manner to achieve an approximately uniform curvature. Due to the greater cross section in the plan and side elevated views at the suspension point referred to as perforated ear 2, the middle point of the device (2) is less flexible than at other points along suspender bar 1 and in fact cannot have equal curvatures along its length due to varying thicknesses of cross section.

In Mayer the trolley wire suspender is attached by one point at 2, as shown in FIGS. 1 and 5 and is designed to act only as a suspender in that the forces applied from the contact wire in a vertical curve pull down and do not push up.

U.S. Pat. No. 2,342,242 to Birch discloses a Conductor Support that is directional in that it is intended for the current collector to travel in one direction only, as described as the approach half A and the leaving half B, and the invention of Birch is intended for normal trolley wire construction with round trolley wire using clinch ears. Birch describes the current collectors making a too abrupt passage from the leaving end of the ear and injuries to the trolley wire result. With Birch, the leaving end B of the clinch ear is altered, as shown in FIG. 8, so that the trolley wire can flex out of the ear as the ear rotates due to the passage of the current collector. Although FIG. 2 shows a vertical angle to the contact wire at the suspension point, it is not due to the overall suspension of the contact wire at the crest of a vertical curve but to the rotation of the clinch ear around a fixed point which is hanger 3 attached to span wire 4. The invention of Birch is not designed for either vertical or horizontal curves of the contact wire but a means to alleviate the wearing out of the contact wire at leaving end B of the clinch ear.

U.S. Pat. No. 499,167 to R. M. Hunter discloses a trolley wire curve where the main wires indicated as C in FIG. 1 carry the tension in the contact line. Around the curve indicated as A, a second or working wire E is suspended under main wire D. The invention is intended to prevent wearing of the main wire as the trolley wheel L runs on the surface of conductor C, F and E but does not touch the main conductor. Hunter further states that by use of this construction, a more rigid and durable curve is produced. Hunter's invention is a device to prevent the wearing of the main contact wire around a conventional curve held in place with standard pullovers. It does not relate to combinations of vertical and horizontal curves of the contact wire but only to holding the conductor in place which has a secondary working conductor suspended from it. The extreme ends of Wire E have inclined castings F which join working wire E to main wire D. The slope produced by this casting F can be of sufficient gradient to cause a pantograph to skip off the wire due to speed and cause an electric arc on the wire. Arcing will degrade the cross section of the wire, leading to accelerated wear and fracture.

U.S. Pat. No. 2,491,973 to R. P. Hanna discloses a Conductor Support in which the device is designed to act as a pulloff for contact wires in curved segments. The disclosed invention is designed for contact wire pulloffs on curves in the horizontal plane only and cannot be adapted for use as a vertical conductor support as the conductor support member 14 has trolley wire clamps 15 attached to it in a horizontal orientation. The adjustability of the device for various curve angles has a preset range as indicated in FIG. 1 by solid pictorial lines and broken pictorial lines. The device cannot be used at zero degrees or any combination from zero to the preset minimum angle. Angle variations, once the device is set, cannot be accommodated without making an adjustment to tension member 30 which adjustment is accomplished by loosening nuts 33 on threaded end portion 32 to let the rod out slightly from opening 28 on pulloff means 17.

SUMMARY OF THE INVENTION

The invention disclosed herein provides a means and method by which a contact wire experiencing an abrupt change in line angle at the crest or trough of a vertical curve or other locations requiring a change in contact wire angles is smoothed out by changing the angle to a curve, parabolic in nature and of such radius that it becomes radial. This disclosed invention further creates a suspension that is elastic and flexible and where a vertical and horizontal curve of the contact are encountered simultaneously. The disclosed invention has a consistent cross section so that curvature bending cannot be decreased at the suspension point, and it is consistent throughout the length of the device. The adjustment of line angle is automatic, and no devices need to be altered. The invention can be used in both the horizontal and vertical planes for curvature in one of the variations. The main contact wire conforms to the curve of the track or of the roadway in a series of small angles through the bending action of the flexible bar or rod, and the current collector passes through the device without leaving the main contact wire. The adjustment of line angle is automatic, and no devices need to be altered. The invention can be used in both the horizontal and vertical planes for curvature in one of the variations.

The invention may be summarized as a device and method that takes the abrupt angle change of a contact wire at the crest point or trough point of a vertical curve and alters the angle to a smooth parabolic arc through a series of small angles on the contact wire which do not impede the action of the current collector traveling along the contact wire. The device provides an elastic suspension where it reacts to the upward pressure of the current collector by rising up so that a hard spot is not encountered and an elastic suspension is achieved. For the vertical curve bar at the crest of a vertical curve where tangent construction is encountered in that no horizontal angle deviation occurs, the device has a series of trolley clamp ears attached directly to the curve bar. The bar has two hanger wires attached to it which rise directly above the bar and attach to a line insulator forming a Vee shape. The connection of the hanging wires from the line insulator to the curve rail bar allows the bar to bend in such a fashion that a curve, parabolic shape and symmetrical on both ends to the center is forced providing a smooth curve and transition of the contact wire at one end through the suspension point to the other end. Where a horizontal curve is encountered at the vertical curve, the curve rail bar is suspended in the same manner and a parabolic shape is produced in the bar, but each trolley clamp is replaced with a curve bow that rotates about its connection point to the curve rail bar which has trolley wire clamps attached to them. Such curve bows with contact wire clamps are identified as prior art and in use in a different method of suspension but when used with this invention achieve simultaneous vertical and horizontal curvature suspension. The horizontal curvature is achieved by allowing the vertical curve rail to pull the contact wire in such a manner that it achieves an inclination of various degrees due to a vertical dead load component and a horizontal curve pull component with a resultant angle of inclination. As the current collector passes under the device, the device is lifted up slightly due to its elastic suspension and the current collector passes without burn or arc. The vertical curve of the contact wire is shaped into a parabolic curve through a series of small angles providing a smooth transition for the current collector from contact wire to device back to the contact wire as no abrupt angle is encountered. To activate this, the maximum contact wire angle at each clamp should not exceed 2 degrees so that the contact wire deviation on each side of the clamp is one degree. This angle allows the pressure of the current collector's upward force at each clamp to lift it so that this angle, produced from the device in the static position with no current collector traveling under it, is nullified and no resulting angle is encountered allowing the current collector to travel through the device as if the contact wire were a smooth curve. Additional contact wire clamps can be added between existing clamps and attached to the bar to decrease the angle at each clamp to 2 degrees. For a 30 degree line angle, 15 clamps would be required. When the vertical curve rail is used at the trough of a vertical curve where there is no horizontal curve pull, the device must be attached to a hold down device of various types that will keep the device in place when the vertical curve rail is supported in this manner. Elasticity is achieved either through a spring suspender that attaches the curve rail bar or by connection to an elastic arm well known to those skilled in the field of overhead lines but which is not part of the disclosure and is identified as prior art.

These may be attached to a fixed structure such as a bracket arm, bridge or tunnel ceiling. The curve rail bar assumes a parabolic shape symmetrical on both ends to the center providing a smooth transition of the contact wire at the suspension point.

When the vertical curve rail is used at the trough of a vertical curve when a horizontal curve is encountered, the curve rail bar consists of a circular bar of spring material which in one version can be threaded that can deflect and bend in angles and planes in relation to its center axis and is attached at its center to a twin elastic arm assembly that restrains the device from the upward force of the contact wire vertical curve while providing elasticity and resiliency from the upward force of the current collector. In this way it can be used as a resilient hold down device for a vertical curve with horizontal curve pull. The clamp ears are attached to a stud with tubular ring for fixing to the circular curve rail bar. The range of vertical angle in this variation is the same as with the rectangular bar. In still another variation, the contact wire clamp ear is composed of two halves which clamp against the groove of the contact wire and around the vertical curve rail rod. The two half clamps are pulled together and held in place by a hollow hex screw similar to that on the clamp ear with boss and stud. It can be oriented on the rod so that its vertical axis is perpendicular to the track or roadway plane or rotated in any desired angle.

Where the vertical curve rail assembly is affixed to a hold down span where two parallel span wires are typically employed, the curve rail assembly utilizes a spring rod, either smooth or threaded, which has the capacity to bend in all directions without distortion or permanence and is able to flex to conform to the vertical line angle. Additional flexibility is achieved at the suspension point where it is attached to the hold down spans and by using a very flexible spring rod inserted into a rigid pipe of short length to which the hold down spans are attached.

The hold down spans can have extensive force applied to counteract the upward force of the trough vertical line angle requiring the suspension attachment to be strong and stiff with resistance to bending. To achieve both stiffness and flexibility, a suspender pipe is used to support the vertical curve rail rod to the hold down spans. Through the ends of the suspender are suspender spring rods which flex under the weight or force of the contact wire and the line angle created by it. The suspender allows the vertical curve rail rod to deflect and form a curve, parabolic in form with the ends having flexibility. The flexibility at the ends of the main rod and the suspender spring rods is self adjusting and can form whatever angle the contact wire line angle conforms to. It also provides flexibility in that as the current collector passes onto and through the device, it lifts slightly due to deflection of the main rod and the suspender spring rod, achieving elasticity. The contact wire attaches to the main rod by a contact wire clamp ear that is screwed onto the boss of a sliding clamp. The sliding clamp is positioned on the main rod and fixed onto it by set screws. The maximum contact wire angle at each clamp should not exceed 2 degrees so that the contact wire deviation on each side of the clamp is one degree. This angle allows the pressure of the current collector's upward force at each clamp to lift it so that the angle produced from the device in the static position with no current collector traveling under it is nullified and no resulting angle is encountered, allowing the current collector to travel through the device as if the contact wire were a smooth curve. Additional sliding clamps or split clamps can be added between existing clamps and attached to the main rod to decrease the angle at each clamp to 2 degrees. For a 30 degree line angle, 15 clamps would be required.

The deflection of the suspender spring rod can be changed by placing a stiffener pipe which has internal threads and screwing it onto and along the suspender spring rod which is threaded so that it butts up against the suspender pipe. The length of the stiffener pipe controls the stiffness of the suspender spring rod by altering its ability to deflect. A longer secondary suspender pipe creates a stiffer suspender spring rod while a shorter stiffener pipe allows more flexibility. The upward force created by the vertical line angle can thus be counteracted so that the vertical curve rail assembly "D" can be at equilibrium and maintain flexibility so that the contact line becomes elastic in nature while held in place.

In still another method that the flexibility of the suspender spring rod can be adjusted to gain more stiffness is by moving the curve rail rod clamp with boss closer to the suspender pipe so that the suspender spring rod is effectively shortened. This method can be coupled with utilization of the stiffener pipe to further decrease the flexibility of the suspender spring rod.

The suspender spring rod is held in place at the stiffener pipe by lock nuts which are threaded and turned onto the suspender spring rod and tightened up against the stiffener pipe on both ends of it. The stiffener pipe, after being screwed onto the suspender spring rod and butting up against the suspender lock nut, is secured in place with lock nuts at its end.

The invention disclosed provides a means of abrupt angle remediation at the crest and trough of vertical curves while maintaining an elasticity and resiliency when a horizontal curve is encountered in the vertical curve. The features and advantages of the invention will be more fully understood from the Description of the Preferred Embodiment(s) taken with the drawings which follow.

BRIEF DESCRIPTION OF THE DRAWINGS

FIG. 1 illustrates a side elevational view of an embodiment of the device of this invention at the crest of a vertical curve without horizontal curve pull.

FIG. 2 illustrates a side elevational view of an embodiment of the device of this invention at the trough of a vertical curve without horizontal curve pull.

FIG. 2A illustrates an enlarged side elevational view of half of an embodiment at the trough of a vertical curve without horizontal curve pull.

FIG. 3 illustrates a side elevational view of an embodiment of the device of this invention at the crest of a vertical curve with horizontal side pull.

FIG. 4 illustrates a side elevational view of an embodiment of the device of this invention at the trough of a vertical curve with horizontal curve pull.

FIG. 15 illustrates a side view of a detail of the hanger wire with loop termination.

FIG. 16 illustrates a cross sectional view of the embodiment of FIG. 18A at section F-F showing a rod at a clamp location.

FIG. 17 illustrates a side view of a section of the vertical curve rail with rod at the elastic arm.

FIG. 18 illustrates a side elevational view of the vertical curve rail at the trough of a vertical curve at a hold down span with a suspender pipe.

FIG. 18A illustrates an enlarged side elevational view of half of an embodiment of the vertical curve at a hold down span with a suspender pipe.

FIG. 19 illustrates a cross sectional view of a section of the suspender pipe and suspender spring rod of the vertical curve rail at the suspender pipe clamp.

FIG. 25 illustrates a cross-sectional view of the embodiment of FIG. 24 of the vertical curve rail rod at section G-G at a split contact wire clamp location.

DESCRIPTION OF THE PREFERRED EMBODIMENT(S)

The vertical curve rail can be used for four different suspension modes, i.e. (1) vertical curve at crest only; (2) vertical curve at crest with horizontal curve; (3) vertical curve at trough only; and (4) vertical curve at trough with horizontal curve.

Figure 1A:
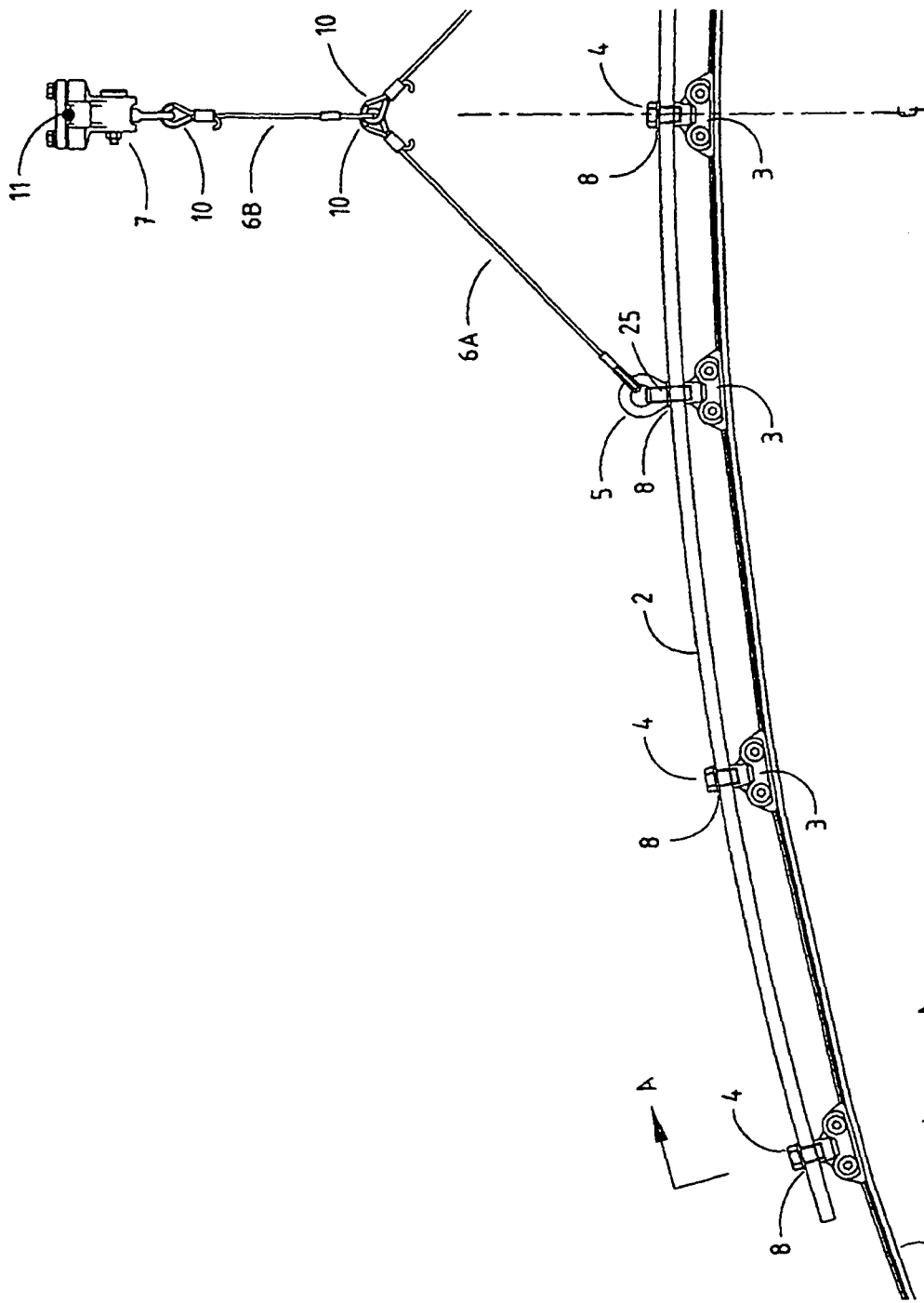
FIG. 1A illustrates an enlarged side elevational view of half of an embodiment at the crest of a vertical curve without horizontal curve pull.

With regard to the first mode, being a vertical curve with no horizontal curve as shown in FIGS. 1 and 1A, contact wire 1 is attached to contact wire clamps 3 that are bolted to curve bar 2. Curve bar 2 and contact wire clamps 3 which hold contact wire 1 are suspended by hanger wires 6 that are looped and secured at their terminations. Hanger wire 6B which holds hanger wires 6A is secured by its loop 10 at a line insulator 7 which can be attached to support span member 11. Support span member 11 can also be a bracket arm pipe, tunnel or bridge ceiling or other method of holding line insulator 7. Hanger wires 6A transfer to hanger wire 6B and line insulator 7 the force of the vertical line angle developed by contact wire 1 onto curve rail bar 2. This vertical line angle is derived from the abrupt change in direction of contact wire 1 which is substantially reduced and smoothed out due to the curvature created in curve rail bar 2. The location of eye nut 5 from the centerline of the curve rail bar 2 allows curve rail bar 2, as seen in FIG. 1, to take the shape of a parabolic curve where ends become a spiral curve to allow a gradual change of curve radius into the constant curve radius. Redrive forces imparted onto the curve bar drive transition from tangent to curve. The parabolic shape created in curve rail bar 2 from the positioning of suspension eye nuts 5 reduces input from the forces of the current collector as it rides along the tangent contact wire 1 at position 1 and transitions along contact wire 1 of vertical curve rail assembly, as shown in FIG. 1, to position 2 through the assembly to position 3 and back onto tangent contact wire 1 at position 4.

Figure 3A:
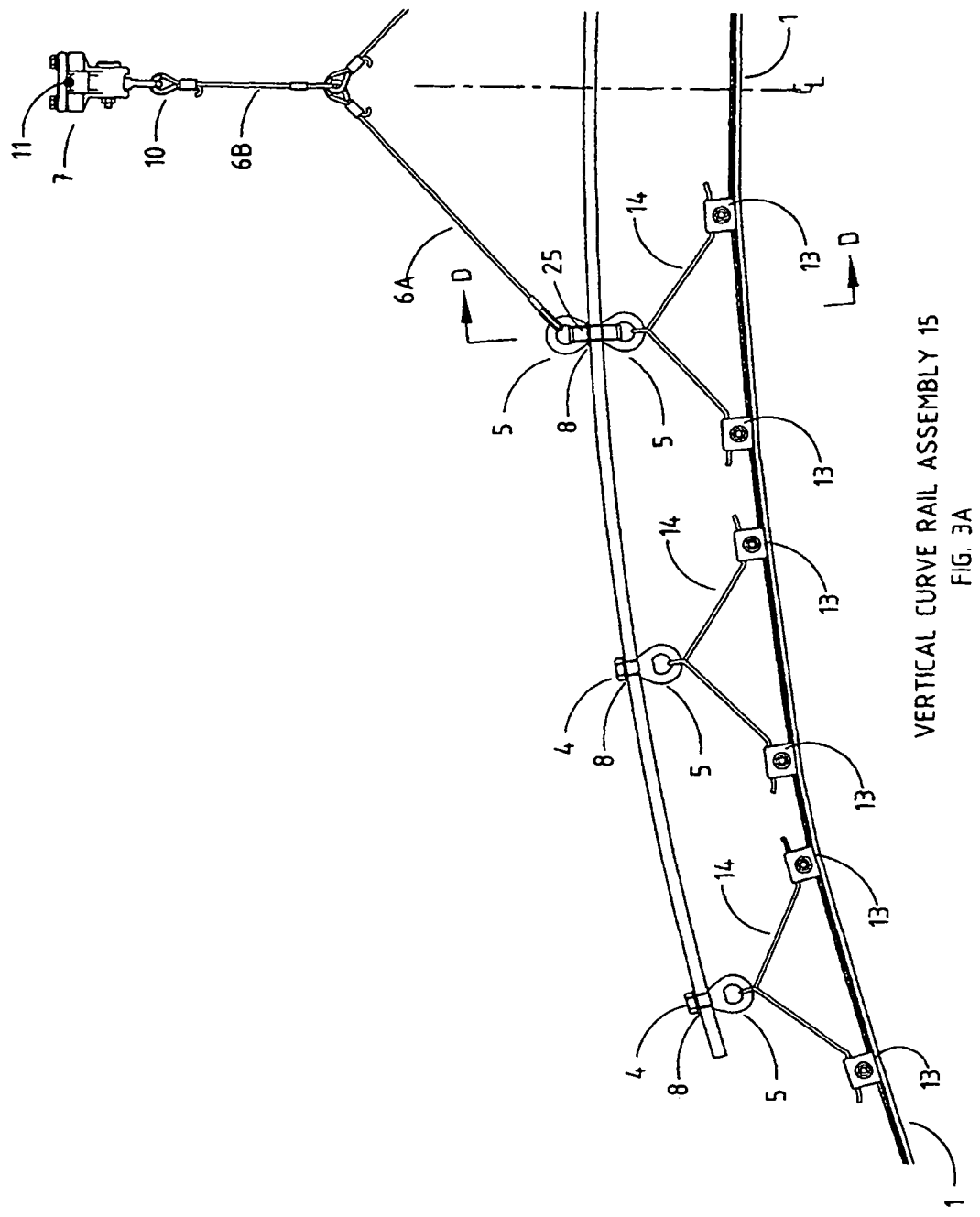
FIG. 3A illustrates an enlarged side elevational view of half of an embodiment at the crest of a vertical curve with horizontal side pull.
Figure 14:
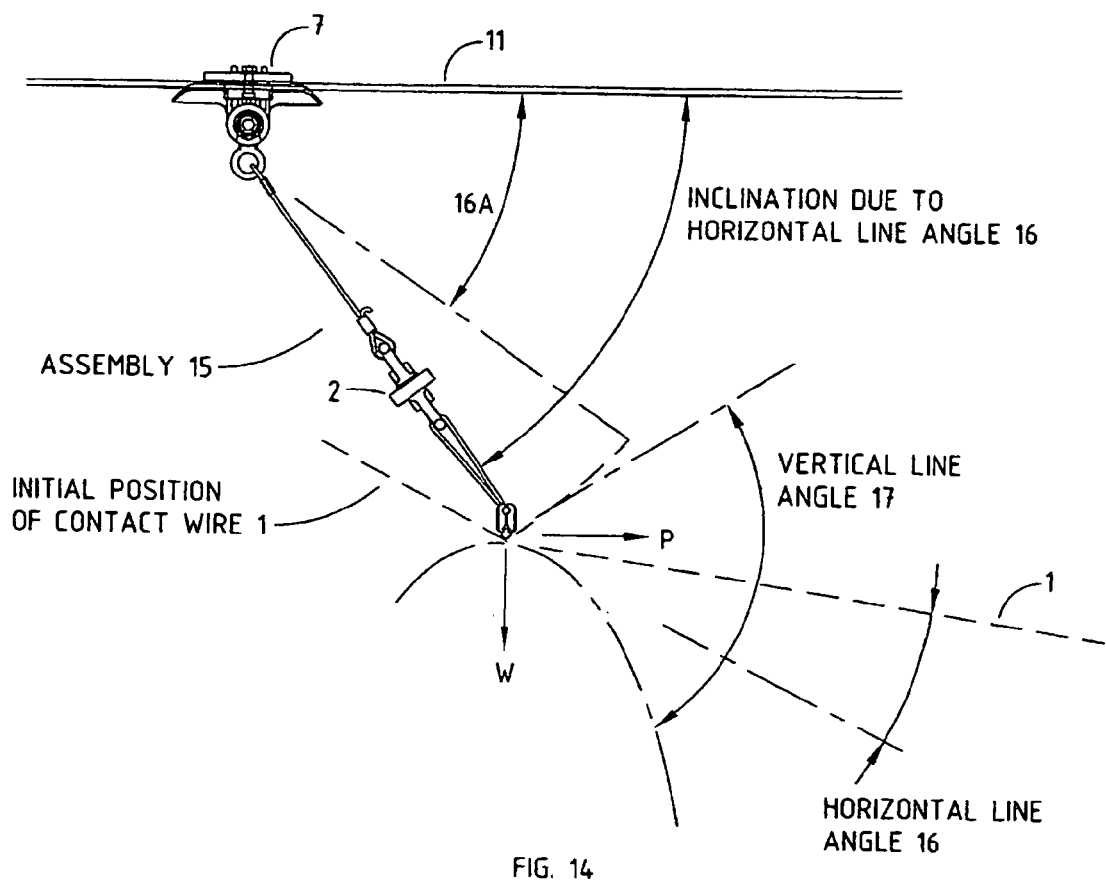
FIG. 14 illustrates a side elevational view of the vertical curve rail at the crest of a vertical curve with a combined horizontal curve.

With regard to the second mode, namely, at the crest of a vertical curve with a horizontal curve imparted into it, the vertical curve rail assembly 15, as shown in FIGS. 3 and 3A, takes two positions, as seen in FIGS. 3, 3A and 14. In FIG. 14, an inclination angle 16 is produced due to the horizontal curve force pull P which acts against the dead weight W of the entire assembly 15 where the geometric component of the resultant force R creates a resultant angle, also called inclination angle 16. Contact wire clamp for curve bow 13 can be adjusted on the curve bow rod so that it sits vertical or at another angle to the track or roadway plane. This arrangement allows a trolley pole current collector to ride through the clamp without undue disturbance as the clamp can be adjusted so that its sides are parallel to the collectors shoe of the trolley pole or vertical to the pantograph current collector. A resilient or soft suspension which prevents contact wire wear results due to this inclination angle 16. As the force of the passing current collector pushes up against curve rail assembly 15, shown in FIGS. 3 and 14, a new inclination angle is provided by the lifting of curve rail assembly 15. This new inclination angle 16A does not change vertical line angle 17 as this is determined by the construction of the overhead line. As the current collector passes through vertical curve rail assembly 15 and no longer exerts a force against it, the assembly lowers into its static position and inclination angle 16 is reestablished.

Figure 5:
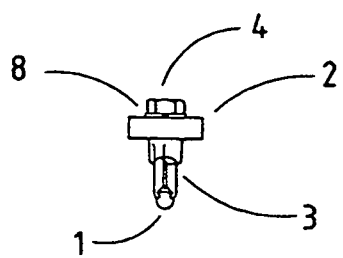
FIG. 5 illustrates a cross sectional view of an embodiment of FIG. 1A at section A-A at the crest of a vertical curve at the connection of the bar to the contact wire where it is fixed and bolted tight and FIG. 2 at section A-A at the trough of a vertical curve at the connection of the bar to the contact wire where it is fixed and bolted tight.
Figure 6:
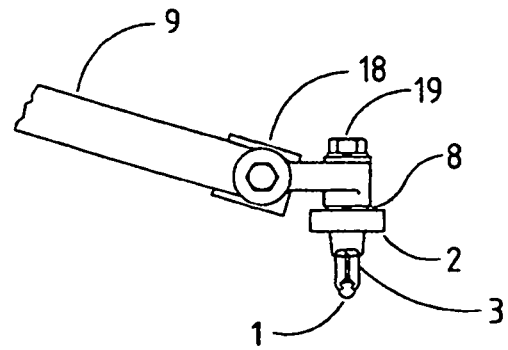
FIG. 6 illustrates a cross sectional view of the embodiment of FIG. 2A at section B-B showing an elastic arm attached to the curve rail.
Figure 7:
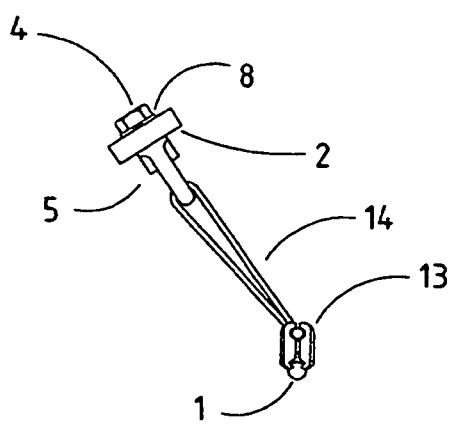
FIG. 7 illustrates a cross sectional view of the embodiment of FIG. 3 at section C-C showing an eye nut attached to the curve rail bar for holding the curve bow and contact wire clamps.
Figure 8:
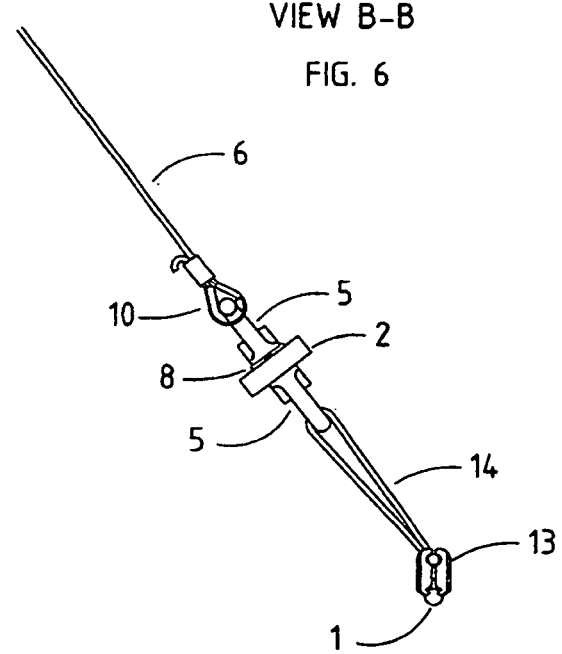
FIG. 8 illustrates a cross sectional view of the embodiment of FIG. 3A at section D-D where two eye nuts are secured to each other to the curve rail bar for holding the curve bow and contact wire clamps.
Figure 11:
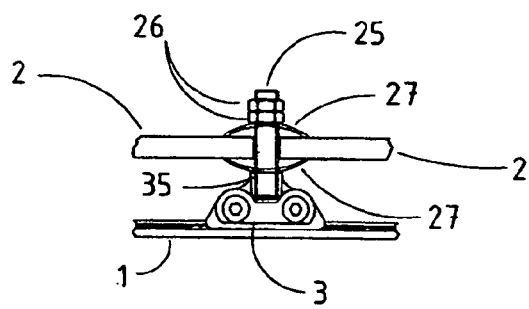
FIG. 11 illustrates a cross sectional view through section A-A of FIG. 2A where additional resiliency and/or spring nuts is/are required.
Figure 12:
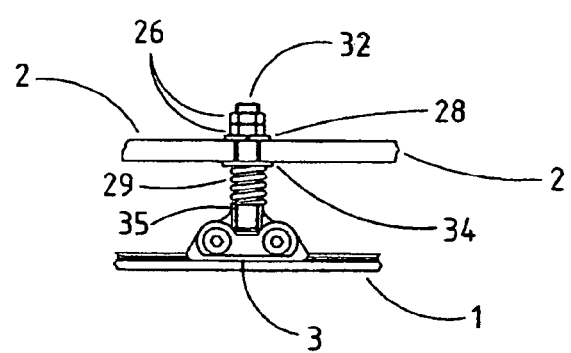
FIG. 12 illustrates a cross sectional view through section A-A of the embodiment of FIG. 2A where additional resiliency and/or spring nuts is/are required.

With regard to the third mode where there is a trough of a vertical curve only, the vertical curve rail, as shown in FIGS. 2 and 2A, acts as a hold down for contact wire 1 where the vertical line angle 17 creates an upward force which vertical curve rail assembly 24 counteracts. Curve rail bar 2 is held in place by the use of elastic arms 9 due to their ability to counteract uplift while maintaining elasticity and allows the vertical curve rail assembly to maintain stability when no current collectors are traversing under it. As the current collector passes from contact wire 1 onto assembly 24, and along to the center of the assembly, assembly 14 rises from the upward force of the current collector cresting elastic suspension and a smooth travel path for the current collector. This is achieved due to the transfer of upward forces from vertical line angle 17 to elastic arms 9 which act as a resilient spring. The location of elastic arms 9 in the assembly allows curve rail bar 2 to attain a curvature, as shown in FIG. 2, that of a parabolic curve which is more fully described under the description of the first mode. Additional resiliency can be achieved by substituting the clamp arrangement, as shown in FIG. 5, with the clamp arrangement shown in FIG. 11 or FIG. 12. In FIG. 11 contact wire clamp 3 has placed in its boss 35 a threaded rod 25 which protrudes through a hole in curve rail bar 2. This view shows the use of bellevue spring washers on the top and bottom of the curve rail bar with the contact wire clamp ear stud inserted between them. A set of bellevue spring washers 27 are placed on the top and bottom of curve rail bar 2 so that the stud 25 for clamp ear protrudes through the hole of the washers. Two nuts 26 are turned on stud 25 and tightened against the top bellevue spring washer 27 so that the boss 35 of contact wire clamp ear 3 bares against the bottom bellevue spring washer 27, allowing constrained movement of contact wire clamp 3 in the vertical curve rail bar 2. When the upward force of the current collector passes under it, the movement of vertical curve rail assembly 24 is enhanced by the ability of additional contact wire movement due to the resiliency of the bellevue spring washers 27 shown in FIG. 11. This additional resiliency can also be achieved with the substitution of the clamp arrangement shown in FIG. 5 with the clamp arrangement shown in FIG. 12. FIG. 12 shows the use of a helical coil spring between the top of the contact wire clamp ear and the bottom of the curve rail bar. In this arrangement contact wire clamp 3 has placed in its boss 35 a threaded rod 32 which provides through a hole in curve rail bar 2 a helical coil spring 29 is placed over the threaded rod 32 and that rod is inserted into the hole in vertical curve rail bar 2. Two nuts 26 are turned on threaded rod 32 to pull contact wire clamp 3 towards vertical curve rail bar 2 to tighten coil spring 29. The amount of stiffness of the spring is determined by how close it is to the bottom of vertical curve rail bar 2. When in place, the upward force of the current collector passing underneath vertical curve rail assembly 24 experiences additional resiliency due to the enhanced contact wire movement due to the resiliency of helical coil spring 29 shown in FIG. 12.

Figure 4A:
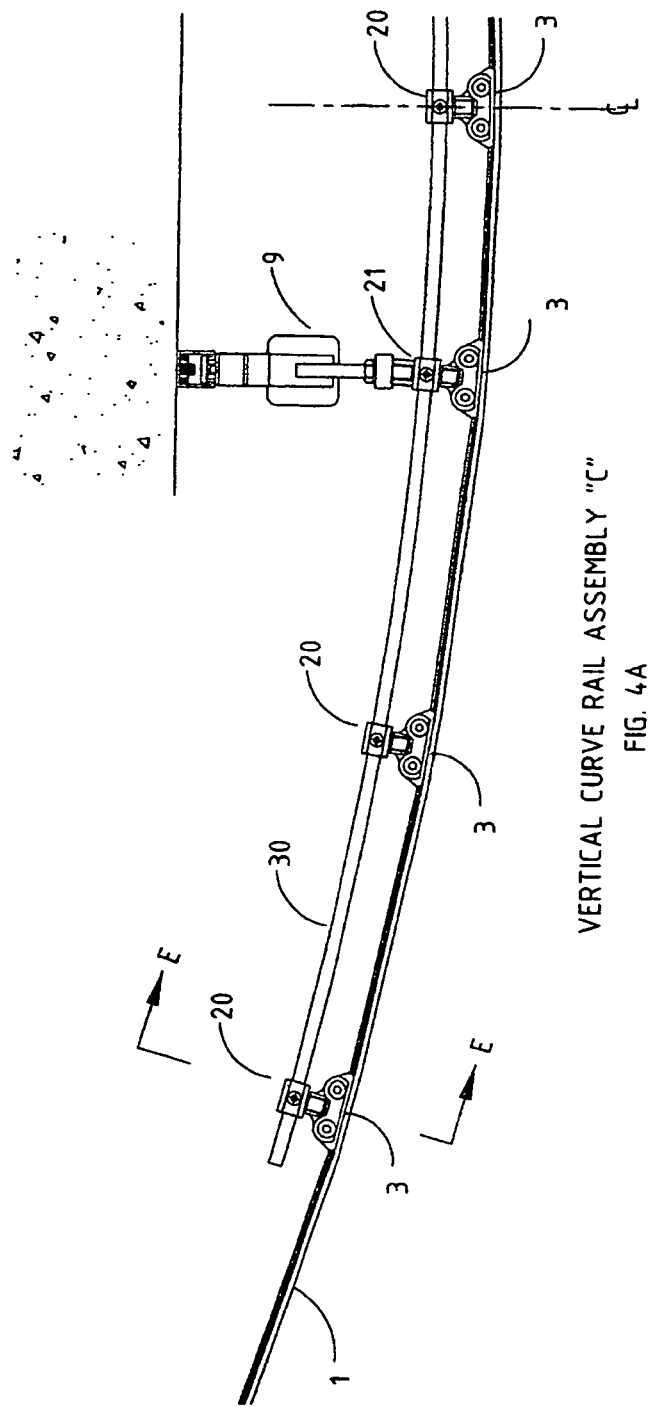
FIG. 4A illustrates an enlarged side elevational view of half of an embodiment at the trough of a vertical curve with horizontal side pull.
Figure 9:
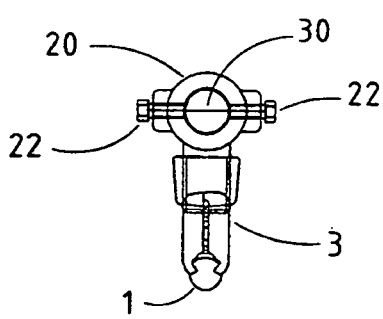
FIG. 9 illustrates a cross sectional view of the embodiment of FIG. 18A at section E-E where a circular clamp is put over the curve rail rod for attaching a contact wire clamp ear to its stud.
Figure 10:
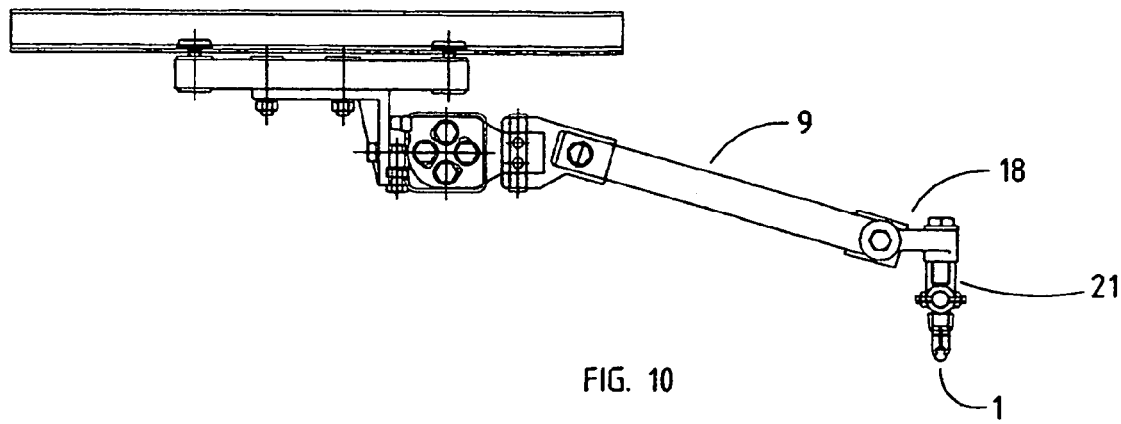
FIG. 10 illustrates a side elevational view of the embodiment of FIG. 10 where an elastic arm, tunnel arm or resilient arm is attached to the curve rail rod.
Figure 13:
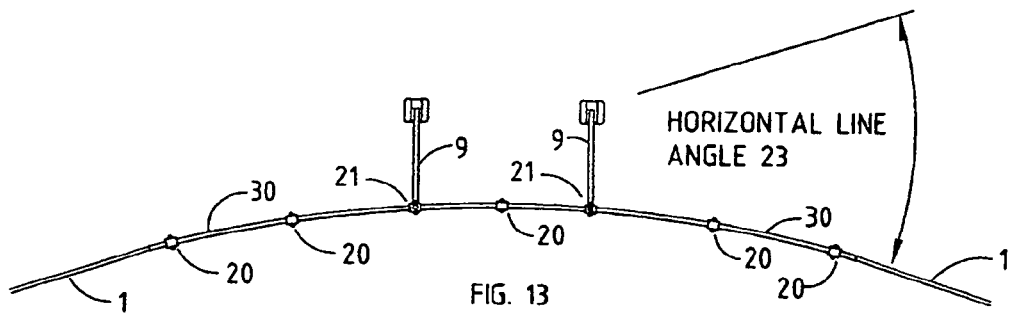
FIG. 13 illustrates a plan view of the vertical curve rail with flexible bar with a horizontal line angle.

With regard to the fourth mode where there is a trough of a vertical curve with a horizontal curve, the vertical curve rail, as shown in FIG. 4, FIG. 4A and FIG. 13, acts as a "hold down" and a pullover simultaneously for contact wire 1, the vertical line angle 17 creates an upward force which vertical curve rail assembly "C" counteracts, while simultaneously counteracting horizontal line angle 23 which is also created by contact wire 1. The line angles 17 and 23 cause rod 30 to bend vertically and horizontally. A series of special clamps 20 slide over rod 30 and lock into place with set screw 22, as shown in FIG. 16 and FIG. 9. As seen in FIGS. 16 and 17 clamp 21 is positioned on the bar at the elastic arms where boss 37 of clamp 21 allows a threaded rod 32 to be turned into it. Threaded rod 32 is secured into the end of elastic arm 18 by two nuts 33 and 48 tightened against the top end of elastic arm 18. First nut 33 is turned down tight and second nut 48 is turned down tight onto the first nut 33 and used as a locking nut. The end fitting 18 of elastic arm 9 is adjustable so that the vertical plane of the vertical curve rail with rod can be made perpendicular to the super elevated track plane. A clamp 3 is attached to sliding clamps 20 and 21 which clamp onto contact wire 1.

Figure 20:
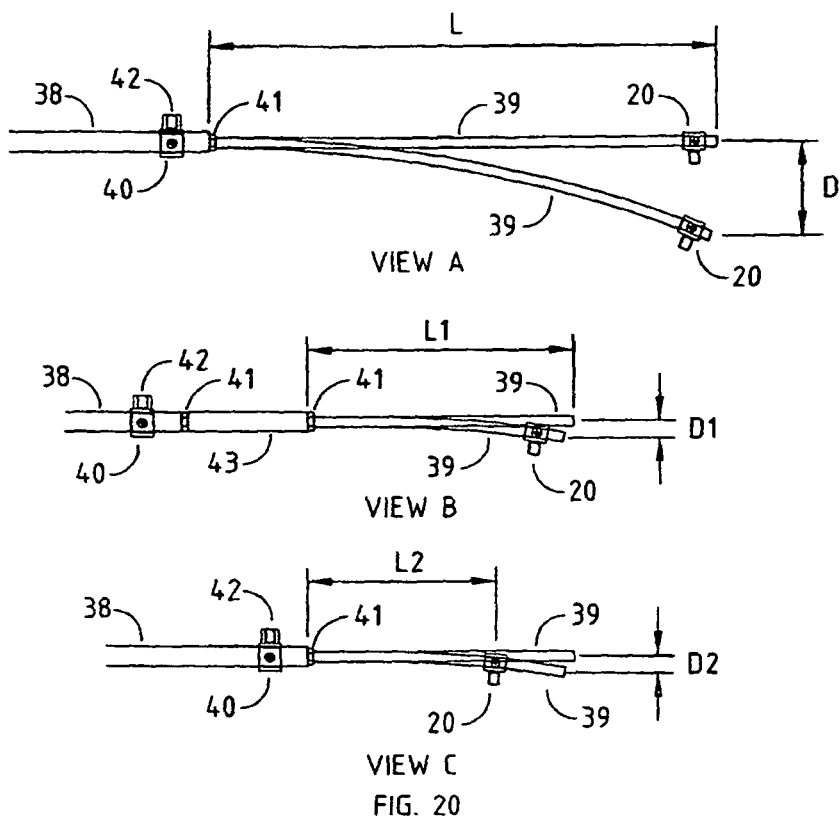
FIG. 20 illustrates a side elevational view of the suspender pipe and suspender spring rod in deflection and with means to change deflection shown in three views.
Figure 21:
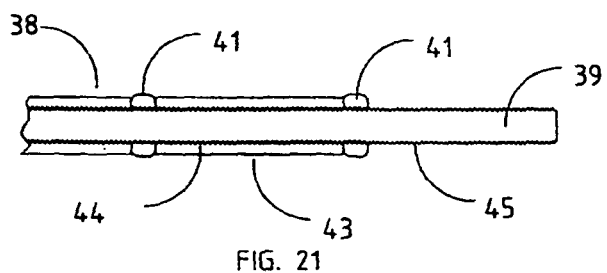
FIG. 21 illustrates a side cross sectional view of stiffener pipe in relation to the suspender pipe and suspender spring rod.
Figure 22:
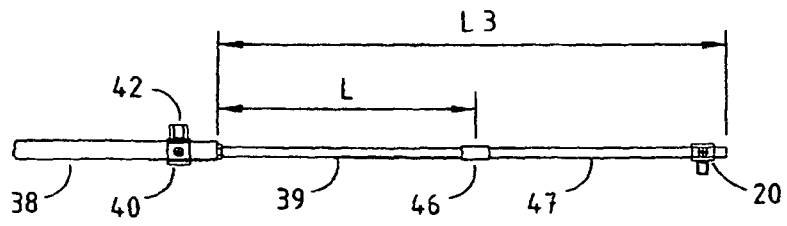
FIG. 22 illustrates a side elevational view of the suspender pipe and suspender spring rod with rod coupling and suspender spring rod extension.
Figure 23:
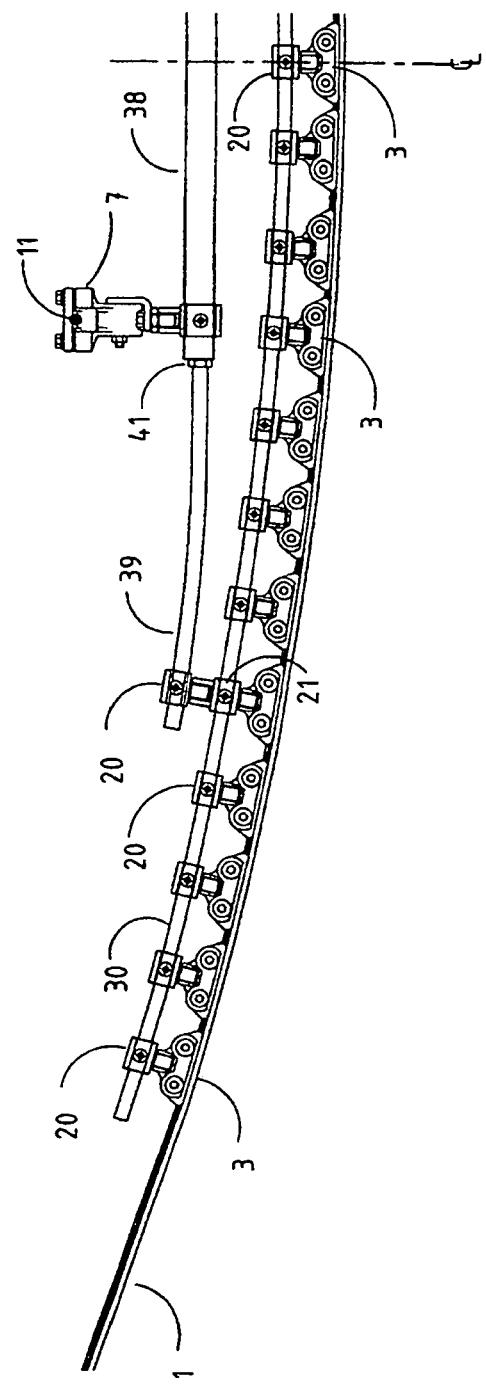
FIG. 23 illustrates an enlarged side elevational view of half of an embodiment of the vertical rail rod at a hold down span with a suspender pipe with additional trolley wire clamps to decrease the angles at the contact wire clamps.
Figure 24:
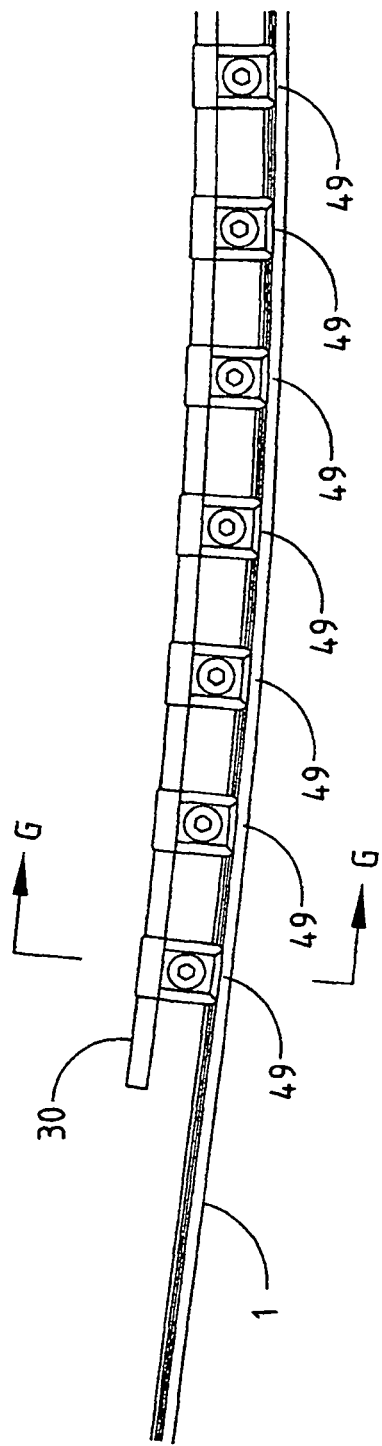
FIG. 24 illustrates a side elevational view of the curve rail rod with multiple contact wire split clamps for decreasing the angle at the contact wire clamps.

When clearance between the rod 30 and the tunnel, ceiling, bridge or other attachment point for elastic arms 9, as seen in FIG. 3, does not allow the use of elastic arms 9 due to restricted vertical or horizontal clearance, elastic arm 9 can be substituted with suspender spring rod 39 and suspender pipe 38 which provide resiliency and support for vertical curve rail assembly D, as shown in FIGS. 18 and 18A. This version can also be used with hold down span wires. With this version, suspender pipe 38 has suspender pipe clamp 40 placed over it so that a means for attachment can be secured to its boss 42 by a bolted connection or attachment of a line insulator 7. Suspender spring rod 39, which for this version is threaded, is inserted into suspender pipe 38 and protrudes beyond it for a predetermined distance in that its length L creates the required resiliency with sufficient stiffness to produce the required deflection D, as shown in FIG. 20. The length L of suspender spring rod 39 remains constant but its amount of deflection can be altered by reducing the deflection length L. To achieve a reduction in deflection, a stiffener pipe 43 with internal threads is screwed onto suspender spring rod 39 whose exterior threads 45 match and are compatible with internal threads 44, as shown in FIG. 21. The reduced length L has less deflection for the same applied weight or force W that the vertical curve rail assembly D must balance. This is shown in FIG. 20 where view A shows the full length L of suspender spring rod 39 with full deflection D from weight W. View B shows reduced deflection length L, and subsequent deflection D, from weight W by the addition of stiffener pipe 43 and suspender rod nut 41. View C shows the same result but decreases the deflection length L to $L_2$ by positioning curve rail rod clamp with stud 20 so that it is closer to stiffener pipe 43 where a smaller deflection $D_2$ results without altering the length of suspender spring rod 39. Consequently, to achieve an increase in deflection, rod coupling 46 is screwed onto the end of suspender spring rod 39, and suspender spring rod extension 47 is screwed into rod coupling 46 to extend the length of the suspender spring rod to a length $L_3$, thus achieving the ability for greater deflection. Curve rail rod clamp with stud 20 is placed over suspender spring rod extension 47, as shown in FIG. 22.

Although the present invention has been described with reference to particular embodiments, it will be apparent to those skilled in the art that variations and modifications can be substituted therefor without departing from the principles and spirit of the invention.

I claim:

1. A suspension method for attaching a contact wire to a support surface for overhead contact wires subjected to abrupt contact wire angle changes at the trough and crest of a vertical curve for tangent suspension to a suspension wire, comprising:

provide a curve rail bar made of flexible spring material curvable to match the curve of said vertical curve;

providing a plurality of clamp ears for attaching said curve rail bar to said contact wire which curve rail bar is supported at said trough and crest of said vertical curve;

attaching said clamp ears to said curve rail bar and to said contact wire;

supporting said curve rail bar at said trough and crest of said vertical curve;

providing first and second attachment members;

attaching said attachment members to a selected different one of said clamp ears;

providing first and second elastic arms, each having first and second ends;

attaching said first ends of said elastic arms to said first and second attachment members, respectively, and said second ends of said elastic arms to said support surface;

forming said curve rail bar being in a curve of a varying radius smoothing out said abrupt angle change in said contact wire; and conforming said curve rail bar to curves of different degree by bending in a smooth curve from said attachment members and supporting said contact wire in said same smooth curve;

wherein said curve rail bar is circular in cross-section and said clamp ears are disposed slideably on said curve rail bar for adjusting to a desired position, each clamp ear further including a set stud for fixing the clamp ear in place on said curve rail bar.

2. A suspension apparatus attached to a support surface for overhead contact wires subjected to abrupt contact wire angle changes at the trough and crest of a vertical curve for tangent suspension to a suspension wire, comprising:

a curve rail bar made of spring material curvable to match the curve of said vertical curve;

a plurality of clamp ears attaching said curve rail bar to said contact wire which curve rail bar is supported at said trough and crest of said vertical curve;

first and second attachment members, each attached to a selected different one of said clamp ears; and first and second elastic arms, each having first and second ends, said first ends attached to said first and second attachment members, respectively, said second ends of said elastic arms attached to said support surface, said curve rail bar being formed in a curve of a varying radius smoothing out said abrupt angle change in said contact wire, said curve rail bar being flexible in nature to conform to curves of different degree, where said curve rail bar bends in a smooth curve from said attachment members and supports said contact wire in said same smooth curve;

wherein said curve rail bar is circular in cross-section and said clamp ears are disposed slideably on said curve rail bar for adjusting to a desired position, each clamp ear further including a set stud for fixing the clamp ear in place on said curve rail bar.

3. The suspension apparatus of claim 2 further including a suspender pipe and a suspender spring rod.

4. The suspension apparatus of claim 3 wherein said suspender pipe is attached to said suspender spring rod alters the deflection of said suspender spring rod.

5. The suspension apparatus of claim 4 wherein each of said clamp ears with set stud can be repositioned towards said suspension pipe for altering the deflection of said suspender spring rod.

6. The suspension apparatus of claim 2 wherein each of said clamp ears with set stud further includes a helical coil spring held with a nut on said set stud on said curve rail bar for added resiliency.

7. The suspension apparatus of claim 2 wherein each of said clamp ears with set stud further includes two bellevue spring washers held with nut on said set stud on said curve rail bar for added resiliency.

* * * * *